US008934762B2

(12) United States Patent
Schmit et al.

(10) Patent No.: US 8,934,762 B2
(45) Date of Patent: Jan. 13, 2015

(54) APPARATUS AND METHODS FOR ALTERING VIDEO PLAYBACK SPEED

(75) Inventors: Michael L. Schmit, Cupertino, CA (US); Shivashankar Gurumuthy, Santa Clara, CA (US); William S. Herz, Hayward, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 275 days.

(21) Appl. No.: 13/315,670

(22) Filed: Dec. 9, 2011

(65) Prior Publication Data

US 2013/0148940 A1 Jun. 13, 2013

(51) Int. Cl.
*H04N 5/783* (2006.01)
*H04N 5/931* (2006.01)

(52) U.S. Cl.
USPC ........... 386/350; 386/345; 386/351; 386/347; 386/248; 386/206

(58) Field of Classification Search
USPC .................. 386/345, 347, 248, 206, 350, 278
See application file for complete search history.

(56) References Cited

U.S. PATENT DOCUMENTS

| 5,339,108 | A * | 8/1994 | Coleman et al. | ............ 375/240.2 |
| 6,557,042 | B1 * | 4/2003 | He et al. | .......................... 709/231 |
| 8,340,509 | B2 * | 12/2012 | Bohrer et al. | .................. 386/344 |
| 2003/0184679 | A1 * | 10/2003 | Meehan | ......................... 348/565 |
| 2007/0101264 | A1 * | 5/2007 | Abanami et al. | .............. 715/716 |

* cited by examiner

*Primary Examiner* — Helen Shibru
(74) *Attorney, Agent, or Firm* — Volpe and Koenig, P.C.

(57) ABSTRACT

Methods and apparatus that facilitate the relatively smooth playback of video at an altered playback speed. Video frames are scored and selected for removal (or duplication) to provide faster (or slower) playback speed based when the video is displayed at a predetermined frame rate.

26 Claims, 4 Drawing Sheets

APPARATUS AND METHODS FOR ALTERING VIDEO PLAYBACK SPEED

FIELD OF INVENTION

The present invention is generally directed to decoding video and, in particular, to apparatus that facilitates the playback of video at an altered speed and related methods.

BACKGROUND

Various processing devices, for example, graphics processing units (GPUs) have been developed to assist in the expedient display of video. Typically a two-dimensional (2D) and/or three-dimensional (3D) engine will render video as a series of video frames of data.

Real-time playback of video is typically performed at a rate of thirty (30) frames per second (fps). In various situations, such as fast forward playback, it is desirable to speed up the playback of video, but still view 30 frames per second in order to maintain compatibility with the existing infrastructure such as the various display devices, decoders, Internet browser plug-ins, etc. For example, if it is desired to speed up playback by 10% over the normal real-time playback speed, the content of 33 frames of video needs to be played back in the time allocated for 30 frames. One conventional method to achieve a 10% accelerated playback rate is to skip one frame out of every 11 frames so that only 10 of each 11 frames of video are displayed at the 30 fps rate.

Another conventional method is to perform a frame rate conversion such that for each set of 11 video frames, the first frame reflects the actual data of one of the video's frames and the next nine frames are fabricated frames through the use of interpolation of the video data of the following ten frame of the video. The interpolation of video frame data provides relatively smooth motion as compared with simply skipping method. The interpolation-type of conversion, however, typically would be performed by a very costly motion-compensated frame rate conversion algorithm.

Over the years, resolution factors have increased from DVD resolutions (720×480 pixels) to HDTV (1920×1080 pixels). Playback devices can be required to handle video frames having a full bit stream at 1920×1080 or higher, for example, to support various movie playback formats. Also playback devices can have multiple concurrent video stream processing requirements, for example, to support picture in picture (PIP) capability. Although the conventional simple frame skipping method can be adapted for such devices, the time and processing complexity needed to perform the conventional interpolation method for smoother accelerated playback referenced above becomes prohibitive, if it is even able to be done.

SUMMARY OF EMBODIMENTS OF THE INVENTION

Methods and apparatus that facilitate the relatively smooth playback of video at an altered speed are provided in certain embodiments. Preferably, some embodiments provide for video frames that are scored and selected for removal (or duplication) to provide faster (or slower) playback speed based upon scoring.

In one example, a method is provided for facilitating playback speed alteration of a video where the video is defined by a series of video frames that exhibit a playback speed when displayed at a predetermined frame rate. Frame data for a set of a selected number of sequential video frames is buffered. A plurality of interleaved disjoint subsets of video frames of the set of video frames is defined (in certain embodiments such subsets are disjoint subsets). The frame data of each video frame within each subset of video frames is scored to produce an individual frame score for the respective video frame. A subset score is calculated for each subset of video frames based on the individual scores of the video frames within the respective subset. Video frames are selected for altering the playback speed based at least on a comparison of the subset scores, whereby the selected video frames are selected for removal to provide an increased playback speed or are selected for duplication to provide a decreased playback speed.

Where the selected video frames are selected for removal, the non-selected video frames can be displayed at the predetermined frame rate to exhibit an increased playback speed. Where the selected video frames are selected for removal, the video frames can be displayed with duplicates of the selected frames at the predetermined frame rate to exhibit a decreased playback speed.

In another example, an apparatus is provided for facilitating playback speed alteration of a video where the video is defined by a series of video frames that exhibit a playback speed when displayed at a predetermined frame rate. A buffer component is configured to buffer frame data for a set of a selected number of sequential video frames. A processing component is configured to define a plurality of interleaved disjoint subsets of video frames of the set of video frames. The processing component is configured to score the frame data of each video frame within each subset of video frames to produce an individual frame score for the respective video frame and to calculate a subset score for each subset of video frames based on the individual scores of the video frames within the respective subset. The processing component is further configured to select video frames for altering the playback speed based at least on a comparison of the subset scores, whereby the selected video frames are selected for removal to provide an increased playback speed or are selected for duplication to provide a decreased playback speed.

The apparatus may be a complete video system having one or more video capture components, one or more recorded video playing components and/or one or more video display components. Alternatively, the apparatus can be configured as a video data processing device such as a graphics processing unit (GPU).

In another example, a computer-readable storage medium is disclosed in which is stored a set of instructions for execution by one or more processors to facilitate manufacture of an integrated circuit that includes a buffer component configured to buffer frame data for a set of a selected number of sequential video frames and a processing component configured to define a plurality of interleaved disjoint subsets of video frames of the set of video frames, to score the frame data of each video frame within each subset of video frames to produce an individual frame score for the respective video frame, to calculate a subset score for each subset of video frames based on the individual scores of the video frames within the respective subset, and to select video frames for altering the playback speed based at least on a comparison of the subset scores.

The sets of instructions can be provided to facilitate manufacture of a GPU or other video data processor. The computer-readable storage mediums can have instructions that written in hardware description language (HDL) instructions used for the manufacture of a device, such as an integrated circuit.

DETAILED DESCRIPTION OF PREFERRED EMBODIMENTS

Generally, motion pictures and other videos are defined by a series of image/video frames that exhibit the illusion of motion when they are displayed in rapid succession, usually at a predetermined frame rate. Examples of video playback (i.e. video display) include playback from a recorded media, such as a video cassette or DVD, playback from a video broadcast or webcast or playback from a camera or other device that captures live video. Video playback can include a soundtrack in addition to images. Typically, sound is synchronized to the video frames and frame data may include associated image and sound data.

It is well known to define frame images as digital frame data and to buffer the data of a desired number of video frames in the playback of video. For example, in a typical Internet streaming video scenario, the stream of video frame data is usually buffered with 5-20 seconds worth of video data, ahead of what is being displayed. At a conventional 30 frames per second (fps) display rate, this translates into buffering frame data for about 150-600 frames.

As noted above, there are conventional methods to make the playback speed of a video appear to be faster even though the fps display rate remains constant. These methods reduce the number of frames in the series of frames that make up a video, but suffer from various drawbacks noted above.

A variable frame skipping method is provided herein that enables smoother video display at an altered playback speed than the conventional simple skipping method without the need for creation of new interpolated frames. In accordance with one example, selected frames of a set of buffered frames are decoded and analyzed in advance of being displayed in order to determine "best" frames to drop from (or add to) the buffered set of video frames.

A revised set of frames, or at least a leading portion thereof, is then queued for display by a display device at the devices normal fps rate and a next set of buffered frames is processed. The next set of buffered frames preferably overlaps with a trailing portion of the prior set. In practice, the revised set of frames is preferably the original set of frames with selected frames marked with an appropriate queue indication that controls whether the frame is to be removed from the data stream sent to the display device or duplicated in the data stream sent to the display device. The frames in the trailing portion of the set which forms a portion of a next set would preferably be able to have their queue indications altered in connection with the processing of the next set.

The normal fps rate for many display devices is 30 fps. However, the display frame rate can be other than 30 fps and is typically specified in a video's bit stream. For example, frame rates of 24 fps and 29.97 fps are common in the U.S. (NTSC). 25 fps is common in Europe (PAL and SECAM). Content originating on film is typically 24 fps and 25 fps and 29.97 are common for PAL and NTSC Television systems.

Figure 1:
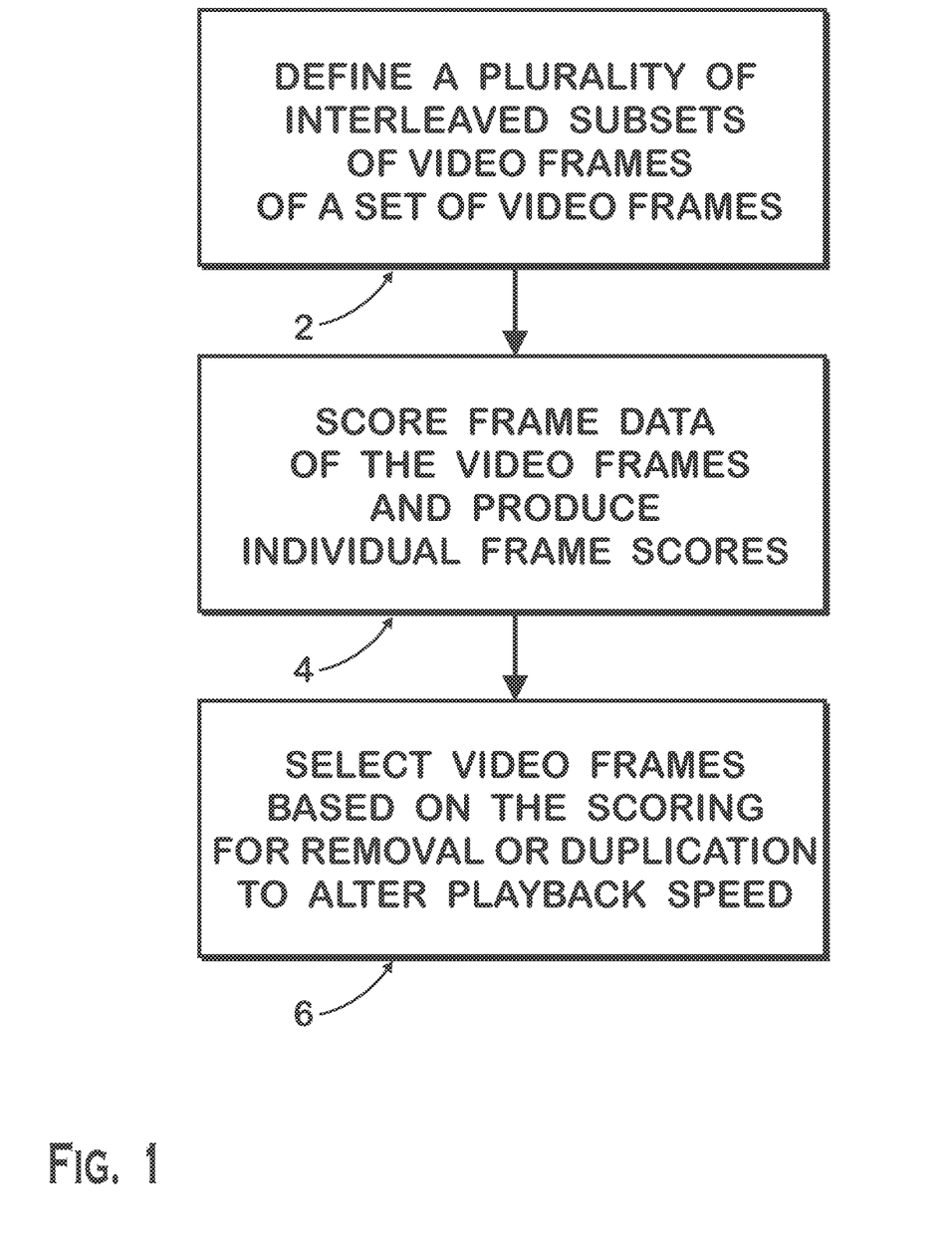
FIG. 1 is a flow diagram an example generalized method in accordance with the teachings of the present invention.

With reference to FIG. 1, one example of a generalized method is illustrated. In step 2, a plurality of interleaved subsets of video frames is defined. In step 4, scoring of frame data of the video frames is performed to produce individual frame scores. In step 6, video frames are selected based on the scoring for removal or duplication to alter playback speed. The method is preferably repetitively applied to successive sets of sequential video frames for as long as the altered playback speed is desired. In practice, frame data is preferably buffered in implementing the method.

A more specific example method includes defining a set size for buffered frames in terms of a number of frames for change speed processing at one time and selecting video speed change factor. A preferred range for the processing set size in from 30-300 frames. A video speed change factor can be user selected and may, for example, be defined as a percentage faster or slower that a "normal" or "real time" video speed such as in a range of 0% to 25% or to 50% or greater.

For example, a frame processing set size of 100 can be used to define sets of 100 buffered frames of the series of frames that make up a video for speed change processing. To speed up (or slow down) the playback video speed by a video speed change factor of 20%, 20 frames need to be removed from (or twenty frames need to be added to) a set of 100 frames. To do this a pattern of frames to be removed (or duplicated) is generated, such that the chosen speed change factor can be obtained.

Figure 2:
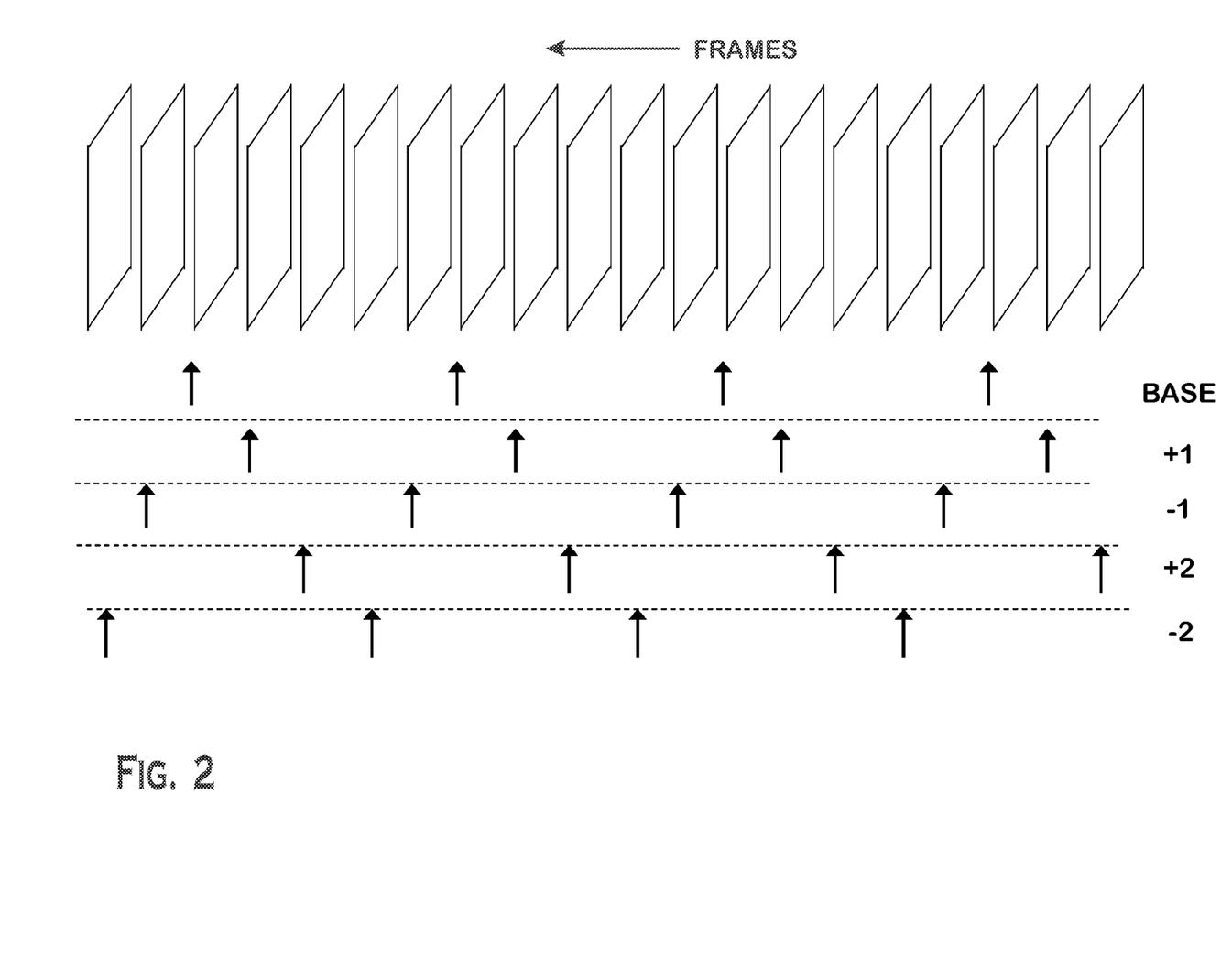
FIG. 2 is an illustration of a series of video frames indicating an example of interleaved subsets of a set of buffered video frames in accordance with the teachings of the present invention.

Referring to FIG. 2, a base pattern is illustrated for a 20% speed change such that the indicated frames define a base subset made of one middle frame out of every five frames of a set of buffered frames. Removing those frames from a 100 frame set results in a 20% faster playback speed when the remaining 80 frames are displayed at the normal fps rate. Adding an adjacent duplicate of each of those designated frames to a 100 frame results in a 20% slower playback speed when the expanded set of 120 frames are displayed at the normal fps rate.

In this case, the base subset pattern is an exact integer pattern of one in every five frames of the processing frame set. However, this is not essential and an exact integer pattern may not be possible in order to achieve a specific playback speed change. For example, the base subset pattern may alternate as 1 in 5 frames, then 1 in 6 frames, then 1 in 5 frames, then 1 in 6 frames, etc. to producing an approximate 18% change in playback speed. Other patterns may be used to match a desired speed change, but generally spacing that is substantially evenly distributed is preferred.

Simply dropping one out of every five buffered frames to affect a 20% faster playback speed is essentially the simple conventional method of creating a faster playback which can cause a juddering video display. However, instead of just removing the frames of the base subset illustrated in FIG. 1, each frame of the base subset is scored based on desired parameters discussed below. The base subset's frames' scores are preferably summed and averaged to define a base subset score.

One or more additional subsets of the set of buffered frames are defined and similarly scored. Preferably each additional subset is made of different frames that are interleaved with the frames of the base subset so that a plurality of disjoint subsets of interleaved frames of the set of buffered frames is defined. In the exemplary embodiment the subsets are disjoint subsets. Other embodiments may include non-disjoint subsets (i.e., overlapping subsets).

In the example illustrated in FIG. 2, in addition to the base subset, four other subsets are illustrated denominated as +1, −1, +2, −2. The +1 subset is made up of the frames within the set of buffered frames that are one frame ahead of each of the frames in the base subset. The −1 subset is made up of the frames within the set of buffered frames that are one frame behind of each of the frames in the base subset. The +2 subset is made up of the frames within the set of buffered frames that are two frames ahead of each of the frames in the base subset. The −2 subset is made up of the frames within the set of buffered frames that are two frames behind ahead of each of the frames in the base subset.

Each frame of the subsets is scored based on desired parameters and each subset's frames' scores are preferably summed and averaged to define a score for the subset. Using an average frame score for a subset's score allows comparisons among subsets having an unequal number of frames, since in some instances a subset may include a slightly different number of frames depending upon how it is defined.

The subset scores are compared and the subset with a best score is selected. The selected subset of frames is then used to create a revised set of frames that has fewer frames where a faster playback speed is desired or that as added frames where a slower playback speed is desired. The revised set of frames may be created from the set of buffered frames by marking the selected subset of frames for removal from the series of frames sent to and/or queued for a display device for a resultant faster video playback speed or by marking the selected subset of frames for adding adjacent duplicate frames to the series of frames sent to and/or queued for a display device for a resultant slower playback speed.

As one alternative, the selected subset of frames can be altered to provide a further refinement of the selection of the frames that are to be removed or added to the series of video frames to be displayed. For example, the individual frame scores of the selected subset's frames can be used for this purpose. For each frame of the selected subset, a comparison of its score with one or more neighboring frames' scores in the set of buffered frames can be made. The neighboring frame with the best individual score can replace an existing frame of the selected subset where it has a better than the existing frame or a score that is better than a threshold amount than the existing frame. Preferably the neighborhood of frames considered for this purpose is relatively small, such as only considering adjacent frames, but extent of the neighborhood can be dependent on the spacing between the existing frames in the selected subset.

In another embodiment, the frame scores are used directly for evaluating which frames should be duplicated (for slower playback) or removed (for slower playback).

The selected subset of frames as altered with such frame replacements is then used to create the revised set of frames. In the case of a faster playback speed, for example, the set of buffered frames having the frames of the altered selected subset marked for removal may serve as the revised set of frames. Preferably, the leading frames of the processed set of buffered frames of to be displayed are given a new time stamp and queued for rendering in the normal display path. Preferably, trailing frames of the set of buffered frames are retained for processing in a next set.

Figure 3:
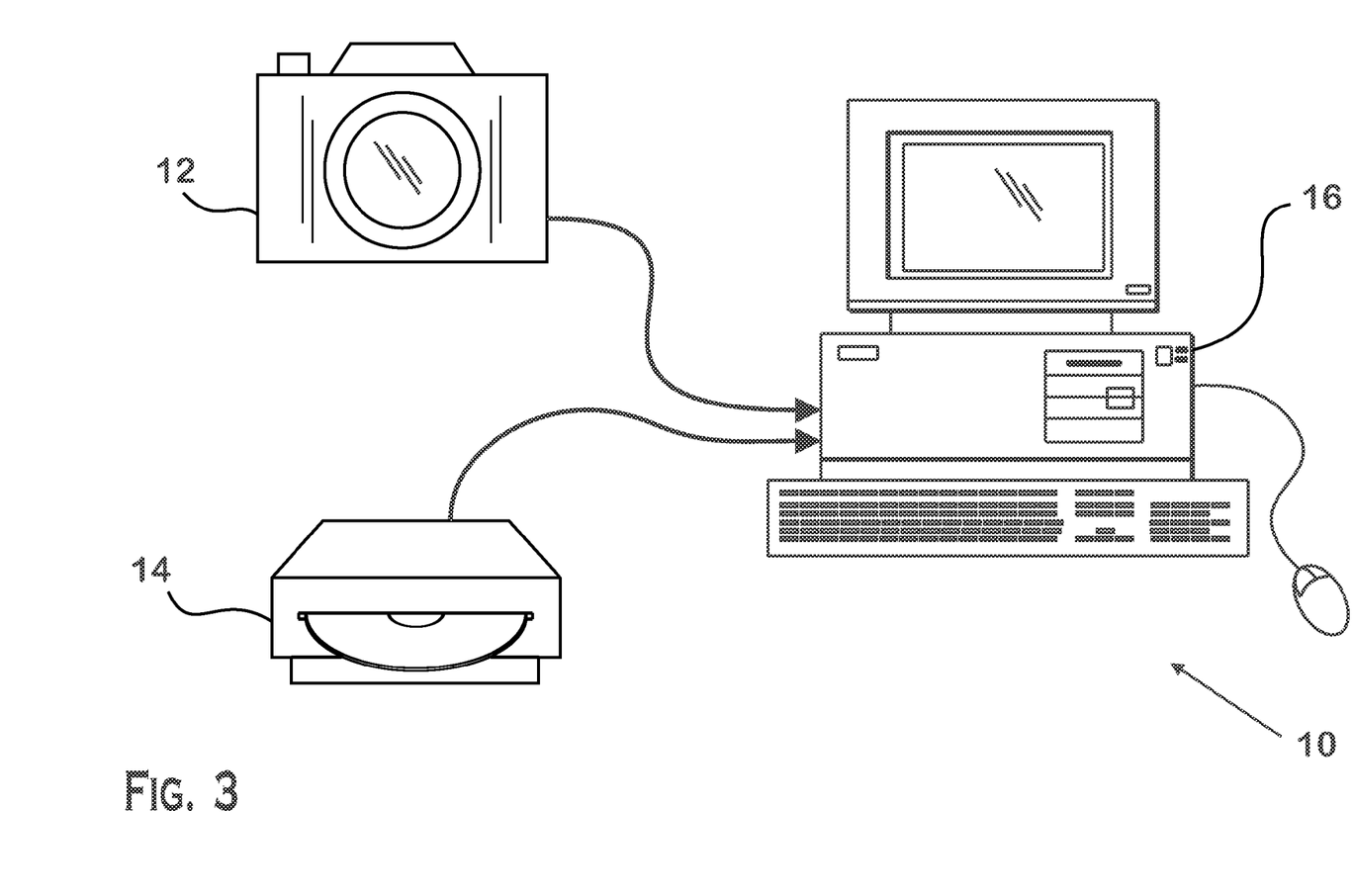
FIG. 3 is a block diagram of an example apparatus in accordance with the teachings of the present invention.
Figure 4:
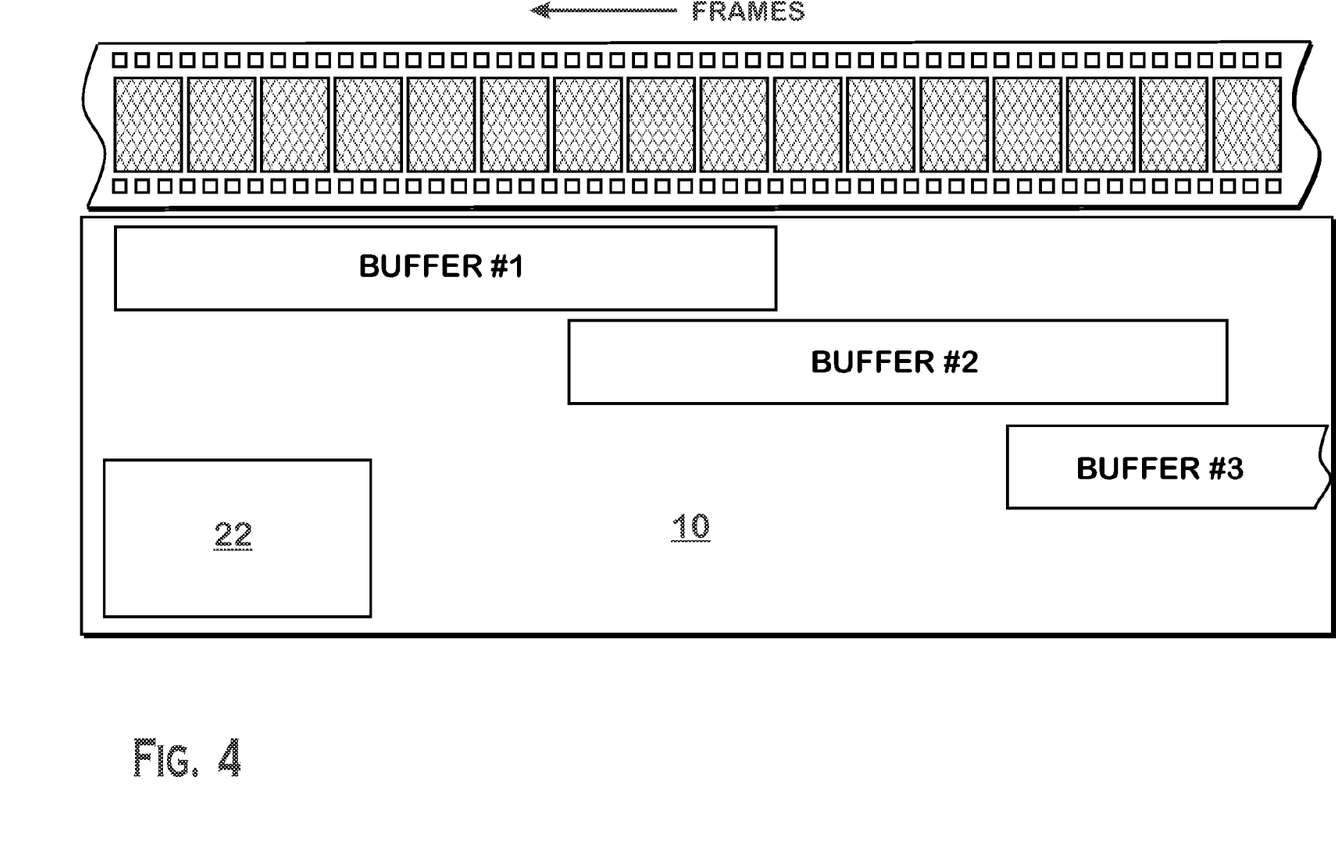
FIG. 4 is a block diagram of an example apparatus that includes data buffers for frame data of successive sets of video frames in accordance with the teachings of the present invention.

With reference to FIGS. 3 and 4, an example apparatus 10 is illustrated that facilitates the playback of video at an altered speed. As illustrated in FIG. 3, the apparatus 10 can be configured as a complete video system having one or more video capture components 12, one or more recorded video playing components 14 and/or one or more video display components 16. Non-limiting examples include tablets, notebooks, desktop computers, video cameras, DVD players, mobile devices such as mobile phones, set top boxes, televisions and combinations thereof. Alternatively, the apparatus 10 can be configured as a video data processing device such as a graphics processing unit (GPU), or alternatively embodied in other types of hardware (e.g., DSPs, ASPs, CPUs, APUs) or software (e.g., as part of an operating system or application running on a hardware device).

As illustrated in FIG. 4, the example apparatus 10 is configured with a processing component 22 and an associated buffer component to buffer video frame data for the series of frames of a video during video playback. The buffer component is illustrated as three separate buffers, buffer #1, buffer #2, buffer #3, but a single buffer can equivalently be employed having portions selectively reused for equivalent functionality. The buffers #1, #2, #3, are sized to accommodate frame data for a set of video frames of a size selected for conducting video frame for playback speed change processing.

Buffer #1 is preferably configured to receive data for a first set of sequential frames of a series of frame of a video for playback speed change processing. Processing component 22 is configured to define a plurality of subsets of the set of frames for which data is stored in buffer #1. Preferably the frame subsets are defined as described above so that a plurality of disjoint subsets of interleaved frames are defined.

Processing component 22 is configured to score the individual frames of the subsets and to score the subsets based on the individual scores of each subset's frames. Processing component 22 is configured to compare the subset scores and select the subset with a best score. Processing component 22 is configured to use the frames of the selected subset as selected frames to define a revised set of frames for video playback. In one example, processing component 22 is configured to define the revised set of frames by marking the frames included in the selected subset of the set of frames stored in buffer #1 for removal where a faster video playback speed is to be achieved or by marking those selected frames for adding adjacent duplicate frames where a slower playback speed is to be achieved. Marking can include, for example, marking the non-selected frames for normal queuing for display.

As one alternative, processing component 22 can be configured to use as the selected frames, frames of an altered version of the selected subset of frames in order to provide a further refinement of the selection of the frames before marking the frames that are to be removed or duplicated for video display. For example, processing component 22 can be configured to use the individual frame scores of the selected subset's frames for this purpose. For each frame of the selected subset, processing component 22 can be configured to make a comparison of that frame's score with one or more neighboring frames' scores in the set of buffered frames. Processing component 22 can be configured to replace an existing frame of the selected subset with the neighboring frame with the best individual score where that neighboring frame has a better score than the existing frame or a score that is better than a threshold amount with respect to the existing frame. Preferably the neighborhood of frames considered for this purpose is relatively small, such as only considering adjacent frames, but can be dependent on the spacing between the existing frames in the selected subset.

In such case, processing component 22 is preferably configured to use, as the selected frames, the frames of the altered selected subset to define the revised set of frames for playback. In the case of a faster playback speed, for example, processing component 22 is preferably configured to mark for removal the frames included in the altered selected subset of the set of frames stored in buffer #1.

With respect to the first set of frames stored in buffer #1 after the selected frames have been marked, the processing component 22 is preferably configured to then queue the frames of that are to be displayed in a conventional display path for display at the normal fps rate. Preferably, each frame that is cued is given a new time stamp.

For faster video playback, where selected frames are marked for removal, the processing component 22 is preferably configured to queue each unmarked frame in succession and to skip the marked frames in the queuing process. For slower video playback, where selected frames are marked for duplication (or, alternatively or in combination with, for interpolation to generate new frames), the processing component 22 is preferably configured to queue each frame in succession, but in queuing a marked frame to also immediately insert a copy of that marked frame in the queuing process.

The processing component 22 is preferably configured to start the queuing of frames at a lead end of the sequential frames stored in buffer #1 and to only continue until frames in a trailing end of the set of frames stored in buffer #1 are reached. Preferably, the apparatus 10 is configured to store a next set of frames for processing in buffer #2, such that there is an overlap of a selected number of trailing frames of the first set of frames stored in buffer #1 with an equal number of leading frames of the set of frames stored in buffer #2. Accordingly, the queuing of those trailing frames of the first set of the series of video frames is deferred until after those frames are processed as part of the frames included as leading frames in the set of frames stored in buffer #2.

The processing component 22 is preferably configured to process the set of frames stored in buffer #2 by defining subsets of frames, scoring individual frames and the subsets, and then marking selected frames in a manner corresponding to the processing of the first set of frames in buffer #1 as described above. However, with respect to the leading frames of the set of frames stored in buffer #2 that had served as trailing frames of the set that was processed, the previously determined individual frame scores are preferably reused, and the frames that were previously marked in processing the first frame set, are preferably used as a part of a base frame subset in defining the subsets of the set of frames stored in buffer #2. This can aid in providing continuity to the cadence of queued frames that can reduce perceived judder in the altered speed playback.

With respect to the set of frames stored in buffer #2 after selected frames have been marked, the processing component 22 is preferably configured to queue the frames of that are to be displayed as described above with respect to the first set of frames. The processing component 22 is preferably configured to start the queuing of frames at a lead end of the series of frames stored in buffer #2 and to only continue until frames in a trailing end of the set of frames stored in buffer #2 are reached. Preferably, the apparatus 10 is configured to store a further next set of frames for processing in buffer #3, such that there is an overlap of the trailing frames of the set of frames stored in buffer #2 with leading frames of the further next set of frames stored in buffer #3.

Preferably, the processing component 22 is configured to process and queue the set of frames stored in buffer #3 in a manner corresponding to the processing and queuing of the set of frames stored in buffer #2 as described above. Preferably, the apparatus 10 is configured to buffer, process and queue further next sets of frames in a manner corresponding to the buffering, processing and queuing of the set of frames stored in buffer #2 as described above until the playback is completed or until playback at the changed speed is no longer desired. It will be recognized that buffer #1 can be reused as buffer #3 if desired or a single buffer may serve to receive the buffered frames where portions of the buffer are reused as needed.

Preferably, the processing component 22 is configured to perform scoring for individual frames based on one or more of the following criteria:
the positioning of the frame within a scene (e.g., whether the frame is a first or last frame in a scene);
the amount of motion relative to a prior frame (e.g., an immediately prior frame);
an average motion comparison to one or more neighboring frames;
relative motion weighted to a location within a frame (e.g., the center of the frame);
motion vector histogram analysis;
whether the frame is part of vertical or horizontal panning;
whether the frame is part of full frame panning or only region panning;
whether the frame includes or is part of text scrolling, such as titles that need to appear smooth;
comparative changes in per macroblock activity for the frame data.

The above list is intended to provide some examples. Other criteria can also be considered. Generally the criteria are selected based on the relative amount of change from one frame to the next.

Also, various scores and weightings for each selected criteria can be tuned to the specific speed change factor being applied and whether the playback speed is to be faster or slower than normal. For faster speeds where frames are being removed from the video's original series of frames, the scoring criteria is preferably selected such that frames reflecting the least amount of motion relative to adjacent frames receive a better score.

In another example for faster playback, each frame can receive a "drop score" that is calculated once per frame as the frame is decoded. The drop score can be later adjusted based on proximity to other dropped frames.

Different scoring elements can be used for different hardware configurations. In some configurations, it may be preferred to use only statistics that can easily be gathered from the decoding process, such as the number of motion vectors associated with each frame. Other configurations with more processing resources may perform more and more per pixel computations to enhance the scoring. For example, in a low-end configuration, scene change information may be determined from the ratio of the number of intra-coded macroblocks to skipped blocks. In a higher end configuration, scene change may be calculated by comparing some percentage of the pixels in one frame to the next frame.

Frames previously marked to be displayed or to be dropped or duplicated that have been retained from a previous set of analyzed frames may receive a score adjustment that varies based on how close the frame is to frames that have been queued for display. The adjustment is preferably made such that the marked status of these older frames may be changed but the probability of change is decreased in preference to maintaining close to an even cadence of the displayed frames.

Preferably, the processing component 22 is configured to process audio data in connection with fast video playback to provide pitch corrected audio. Where pitch corrected audio is provided, the scoring for dropping frames can be based on analyzing the content of the frames in order to hide or minimize the observable temporal artifacts caused by frame dropping.

The processing component 22 may be configured as a GPU that has a hardware decoder to generate decoder statistics used for the scoring. The processing component 22 may include a GPU to buffer, score, re-time-stamp and queue many frames while maintaining compatibility with existing playback infrastructure. Preferably, the processing/buffering set size and scoring methodology are selected based upon the memory capacity and the processing capacity of the apparatus 10 along with the resolution of the video and/or the resolution of the display being performed.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

As will be appreciated, end users may be provided by certain embodiments with smooth faster or slower playback as certain embodiments will enabled relatively reduced time and processing complexity otherwise needed to perform the conventional interpolation method for smooth playback referenced above.

What is claimed is:

1. A method for facilitating playback speed alteration of a video defined by a series of video frames that exhibit a playback speed when displayed at a predetermined frame rate, the method comprising:
   defining a plurality of interleaved subsets of video frames of a set of video frames, wherein the frames included in each subset are different and are equally spaced apart in the set of video frames;
   scoring frame data of the video frames including producing an individual frame score for each video frame and a score for each subset of video frames; and
   selecting one of the plurality of interleaved subsets for altering the playback speed based on the scoring, whereby the selected subset is selected for removal to provide an increased playback speed or is selected for duplication to provide a decreased playback speed.

2. The method of claim 1, wherein when the selected subset is selected for removal, non-selected video frames are displayed at the predetermined frame rate to exhibit an increased playback speed.

3. The method of claim 1, wherein when the selected subset is selected for removal, non-selected video frames are queued for display at the predetermined frame rate to display the non-selected frames to exhibit an increased playback speed.

4. The method of claim 1, wherein the selecting of the subset for altering the playback speed is based at least on a comparison of the subset scores.

5. The method of claim 4, wherein the selecting includes selecting a subset with a best score as the selected subset.

6. The method of claim 4, wherein the selecting includes:
   selecting a subset with a best score;
   comparing individual scores of video frames of the selected subset with scores of respective neighboring video frames from other subsets;
   replacing video frames of the selected subset with respective neighboring video frames upon a predetermined condition based on the individual score comparison to produce an altered selected subset of video frames; and
   designating the video frames of the altered selected subset as the selected subset.

7. The method of claim 1, wherein a subset score is determined by averaging the individual scores of the video frames within the respective subset.

8. The method of claim 1, wherein the video frames of different subsets are offset by a predetermined number of frames from corresponding video frames within a base subset.

9. The method of claim 1, performed with respect to successive overlapping sets of the selected number of video frames of the video frame series such that last video frames in a given set serve as first video frames of a next successive overlapping set.

10. The method of claim 9, wherein individual video frame scores of the last video frames in the given set are used as individual video frame scores of the first video frames of the next successive overlapping set.

11. The method of claim 1 wherein the scoring the frame data to produce individual frame scores is based upon one or more of the following criteria:
   positioning of the frame within a scene;
   an amount of motion relative to a prior frame;
   an average motion comparison to one or more neighboring frames;
   relative motion weighted to a location within a frame;
   motion vector histogram analysis;
   whether the frame is part of vertical or horizontal panning;
   whether the frame is part of full frame panning or only region panning;
   whether the frame includes or is part of text scrolling, such as titles that need to appear smooth; and
   comparative changes in per macroblock activity for the frame data.

12. The method of claim 1 further comprising buffering frame data for the set of video frames.

13. An apparatus for facilitating playback speed alteration of a video defined by a series of video frames that exhibit a playback speed when displayed at a predetermined frame rate, the apparatus comprising:

a processing component configured to:
  define a plurality of interleaved subsets of video frames of a set of video frames, wherein the frames included in each subset are different and are equally spaced apart in the set of video frames;
  score frame data of the video frames to produce an individual frame score for each video frame and a score for each subset of video frames; and
  select one of the plurality of interleaved subsets for altering the playback speed based on the scoring, whereby the selected subset is selected for removal to provide an increased playback speed or is selected for duplication to provide a decreased playback speed.

14. The apparatus of claim 13, wherein when the selected subset is selected for removal, the processing component is configured to send non-selected video frames to a display device for display at the predetermined frame rate to exhibit an increased playback speed.

15. The apparatus of claim 13, wherein when the selected subset is selected for removal, the processing component is configured to queue non-selected video frames for display at the predetermined frame rate to display the non-selected frames to exhibit an increased playback speed.

16. The apparatus of claim 13, wherein the processing component is configured to select the subset for altering the playback speed based at least on a comparison of the subset scores.

17. The apparatus of claim 16, wherein the processing component is configured to select a subset with a best score as the selected subset.

18. The apparatus of claim 16, wherein the processing component is configured to select frames for changing the playback speed by:
  selecting a subset with a best score;
  comparing individual scores of video frames of the selected subset with scores of respective neighboring video frames from other subsets;
  replacing video frames of the selected subset with respective neighboring video frames upon a predetermined condition based on the individual score comparison to produce an altered selected subset of video frames; and
  designating the video frames of the altered selected subset as the selected subset.

19. The apparatus of claim 13, wherein the processing component is configured to calculate subset scores by averaging the individual scores of the video frames within the respective subset.

20. The apparatus of claim 13, wherein different subsets are offset by a predetermined number of frames from corresponding video frames within a base subset.

21. The apparatus of claim 13, wherein the processing component is configured to repetitively select video frames for changing the playback speed with respect to successive overlapping sets of the selected number of video frames of the video frame series such that last video frames in a given set serve as first video frames of a next successive overlapping set.

22. The apparatus of claim 21, wherein individual video frame scores of the last video frames in the given set are used as individual video frame scores of the first video frames of the next successive overlapping set.

23. The apparatus of claim 13 wherein the processing component is configured to score the frame data to produce individual frame scores is based upon one or more of the following criteria:
  positioning of the frame within a scene;
  an amount of motion relative to a prior frame;
  an average motion comparison to one or more neighboring frames;
  relative motion weighted to a location within a frame;
  motion vector histogram analysis;
  whether the frame is part of vertical or horizontal panning;
  whether the frame is part of full frame panning or only region panning;
  whether the frame includes or is part of text scrolling, such as titles that need to appear smooth; and
  comparative changes in per macroblock activity for the frame data.

24. The apparatus of claim 13 further comprising a buffer configured to buffer the frame data for the set of video frames.

25. A non-transitory computer-readable storage medium storing a set of instructions for execution by one or more processors to facilitate manufacture of an integrated circuit that includes:
  a processing component configured to:
    define a plurality of interleaved subsets of video frames of a set of video frames, wherein the frames included in each subset are different and are equally spaced apart in the set of video frames;
    score frame data of the video frames to produce an individual frame score for each video frame and a score for each subset of video frames; and
    select one of the plurality of interleaved subsets for altering the playback speed based on the scoring, whereby the selected subset is selected for removal to provide an increased playback speed or is selected for duplication to provide a decreased playback speed.

26. The non-transitory computer-readable storage medium of claim 25 wherein the instructions are hardware description language (HDL) instructions used for the manufacture of a device.

* * * * *